United States Patent
Misra

(10) Patent No.: US 7,921,426 B2
(45) Date of Patent: *Apr. 5, 2011

(54) INTER PARTITION COMMUNICATION WITHIN A LOGICAL PARTITIONED DATA PROCESSING SYSTEM

(75) Inventor: Manish Misra, Kanpur (IN)

(73) Assignee: International Business Machines Corporation, Armonk, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/180,648

(22) Filed: Jul. 28, 2008

(65) Prior Publication Data

US 2008/0282256 A1    Nov. 13, 2008

Related U.S. Application Data

(63) Continuation of application No. 11/029,586, filed on Jan. 4, 2005, now Pat. No. 7,412,705.

(51) Int. Cl.
  G06F 3/00       (2006.01)
  G06F 9/44       (2006.01)
  G06F 9/46       (2006.01)
  G06F 13/00      (2006.01)

(52) U.S. Cl. ........................................ 719/312; 711/163

(58) Field of Classification Search .................. 719/312; 711/163

See application file for complete search history.

(56) References Cited

U.S. PATENT DOCUMENTS

| | | | |
|---|---|---|---|
| 4,300,192 A | 11/1981 | Couleur et al. | |
| 4,843,541 A | 6/1989 | Bean et al. | |
| 5,117,350 A | 5/1992 | Parrish et al. | |
| 5,659,756 A | 8/1997 | Hefferon et al. | |
| 5,771,383 A | 6/1998 | Magee et al. | |
| 5,875,464 A | 2/1999 | Kirk | |
| 5,897,658 A | 4/1999 | Eskesen et al. | |
| 5,926,833 A | 7/1999 | Rasoulian et al. | |
| 5,996,026 A | 11/1999 | Onodera et al. | |
| 6,154,818 A | 11/2000 | Christie | |
| 6,247,109 B1 | 6/2001 | Kleinsorge et al. | |
| 6,314,501 B1 * | 11/2001 | Gulick et al. | 711/153 |
| 6,334,161 B1 | 12/2001 | Suzuki et al. | |
| 6,567,897 B2 | 5/2003 | Lee et al. | |
| 7,080,291 B2 | 7/2006 | Moriki et al. | |
| 2002/0103943 A1 | 8/2002 | Lo et al. | |

(Continued)

OTHER PUBLICATIONS

Mills et al., "Prototyping Parallel and Distributed Programs in Proteus", "Parallel and Distributed Processing", 1991, Third IEEE Symposium.

*Primary Examiner* — Li B Zhen
*Assistant Examiner* — KimbleAnn Verdi
(74) *Attorney, Agent, or Firm* — Patrick J. Daugherty; Driggs, Hogg, Daugherty & Del Zoppo Co., LPA

(57) ABSTRACT

Each of a plurality of partitions within a logical partitioned data processing system is configured for an inter partition communication area (IPCA) allocated from partition's own system memory. Each partition's IPCA combined together forms a non-contiguous block of memory which is treated as a virtual shared resource (VSR). Access to VSR is controlled by hypervisor to maintain data security and coherency of the non-shared resources of a partition. Messages are written to and read from VSR under a specific partition's IPCA for inter partition communication. No physical shared or non-shared resources are involved during inter partition communication, hence no extra overhead on those resources, thus achieving optimized performance during inter partition communication.

7 Claims, 5 Drawing Sheets

U.S. PATENT DOCUMENTS

| | | |
|---|---|---|
| 2002/0129082 A1 | 9/2002 | Baskey et al. |
| 2002/0129085 A1 | 9/2002 | Kubala et al. |
| 2002/0129172 A1 | 9/2002 | Baskey et al. |
| 2002/0129274 A1 | 9/2002 | Baskey et al. |
| 2003/0041090 A1 | 2/2003 | Armstrong et al. |
| 2003/0167313 A1* | 9/2003 | Brown et al. ............... 709/215 |
| 2004/0153853 A1 | 8/2004 | Moriki et al. |
| 2006/0036816 A1* | 2/2006 | McMahan et al. ........... 711/153 |
| 2007/0028244 A1 | 2/2007 | Landis et al. |
| 2007/0067435 A1 | 3/2007 | Landis et al. |

* cited by examiner

INTER PARTITION COMMUNICATION WITHIN A LOGICAL PARTITIONED DATA PROCESSING SYSTEM

RELATED APPLICATION

This application is a continuation of U.S. application Ser. No. 11/029,586, filed Jan. 4, 2005, now U.S. Pat. No. 7,412,705 B2.

FIELD OF THE INVENTION

This invention relates generally to inter partition communication within a partitioned data processing system, and more particularly to a method and structure for inter partition communication within a logical partitioned data processing system using virtualized shared resources under the control of a hypervisor.

BACKGROUND OF THE INVENTION

In a data processing system with a plurality of partitions, inter partition communication between the firmware and software of two partitions has been a challenge. This difficulty imposes a limitation on sharing vital information between the firmware and software of two different partitions. Further to that, due to lack of well defined techniques for inter partition communication, it also limits the firmware of two given partitions getting actively involved in the each other's error reporting and/or recovery actions.

SUMMARY OF THE INVENTION

A method and apparatus to define inter partition communication using a virtualized shared memory resource, such as a portion of a partition's own allocated memory, is provided. The advantage of this technique is that there is virtually no limit imposed on the message size to be passed across the partitions. Further to that, there is no association with the physical shared and non-shared resources of the data processing system; hence, other critical operations needing such physical resources can run in parallel without additional overhead of inter partition communication on these resources. Also, at run time, resources can be reconfigured dynamically across partitions with ease, or remapping can be accomplished in event of an error condition in one partition.

DESCRIPTION OF THE PREFERRED EMBODIMENT(S)

Figure 1:
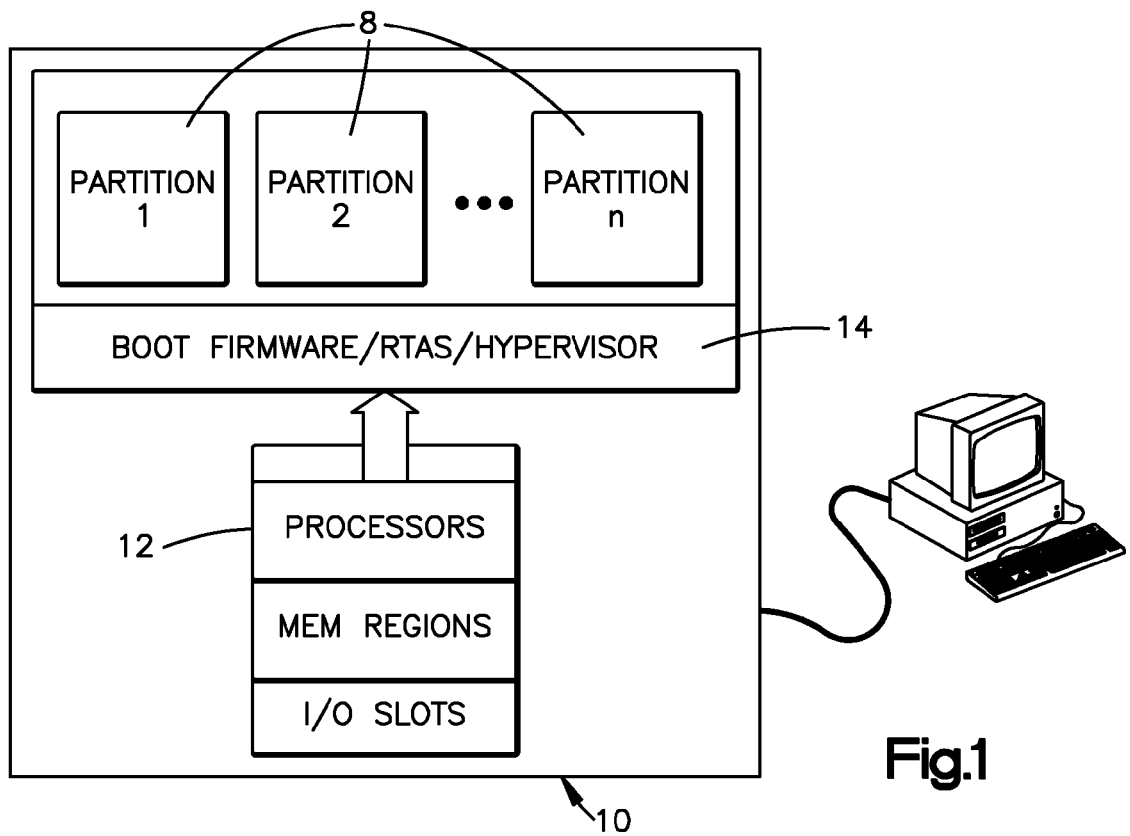
FIG. 1 is a high level block diagram of a data processing system incorporating a hypervisor and logical partitions.
Figure 6:
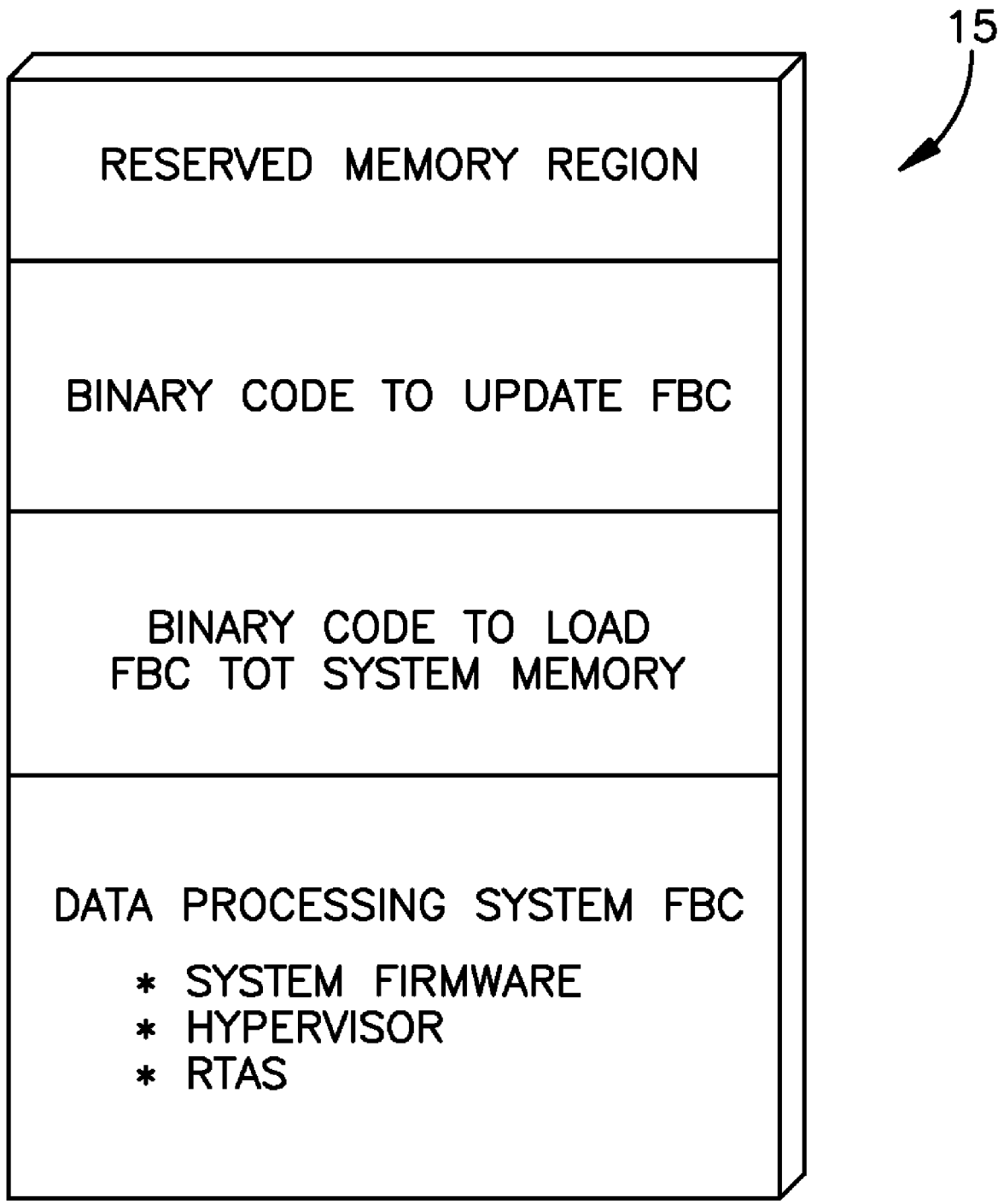
FIG. 6 is a representation of a flash module in which the hypervisor program is stored.

In a data processing system, logical partitioning is frequently done. An example of logical partitioning is shown and described in application Ser. No. 10/112,483, filed Mar. 28, 2002, entitled METHOD AND APPARATUS FOR BACKING UP AND RESTORING DATA FROM NON-VOLATILE MEMORY, now U.S. Pat. No. 6,934,879 B2, which is incorporated herein by reference. FIG. 1 shows, at a very high level, the interposition of a hypervisor as used to control various partitions in a logical partitioned data processing system. Briefly, a data processing system 10 may have multiple heterogeneous operating systems (or multiple instances of a single operating system) running simultaneously under multiple logical partitions 8. Total system resources processors, memory and PCI I/O slots 12 are logically assigned to these partitions in such a way that each partition contains a subset of total system resources. Each of these operating systems may have any number of software programs executing within it. A hypervisor program 14, a very specialized program, entrusted to carefully perform the operations is provided. The hypervisor program is normally stored in a system flash module 15 (FIG. 6) in the server hardware. During system initialization, the hypervisor is loaded into the first available physical address region of system memory by the boot firmware. The hypervisor program is trusted to create partition environments, and is normally the only program that can directly access special processor registers and translation table entries. In conventional architecture, partition programs have no way to access the hypervisor's instructions or data, other than through controlled hypervisor service calls that are part of the processor architecture. These protections allow the hypervisor to perform its duties in a simple and rigorous manner, resulting in the confinement of each operating system to a very tight, inescapable box.

In short, all access by processors and PCI I/O adapters assigned to a partition are controlled by address relocation mechanisms and the mechanisms themselves cannot be tampered with by partition programs, not even by firmware that runs inside the partitions.

Hypervisors and their use are well known in the art; for example, see "LPAR Protection in Firmware" in the article "Logical Partition Security in the IBM eServer pSeries 690" which is incorporated herein by reference. It is to be understood, however, that the hypervisor is not limited to this particular IBM system. Each partition 8 in the data processing system with a plurality of partitions has a block of total system memory assigned to it. Out of this system memory block assigned to a partition, a portion of memory is reserved for inter partition communication. For example, if partition #1 has a block of system memory, memory block #1 e.g. 1 gigabyte, assigned to it, a small portion, portion #1 e.g. 128 megabytes, is reserved for inter partition communication. This portion of memory is termed as Inter Partition Communication Area #1 (IPCA#1) under partition #1 or IPCA# 1, and the same for partitions #2, #3 . . . #N. After such an assignment, the base address of each IPCA#1 . . . #N is provided to hypervisor firmware. Each partition within the plurality of partitions reserves such IPCAs in its memory block and registers the base address of its own IPCA to hypervisor firmware.

A look up table (TABLE 1 below) is maintained containing all such base addresses of IPCAs defined in various partitions.

(It will be noted that TABLE 1 is constructed for an operating system that has four partitions; however, this is not to be construed as limiting since more or less than four partitions can be present.)

TABLE 1

|  | Partition's Memory | | Partition's IPCA | | |
| --- | --- | --- | --- | --- | --- |
| Partition ID | Start Address | End Address | Start Address | End Address | IPCA Size |
| Partition # 1 | 0x0000 0000 | 0x3FFF FFFF | 0x37FF FFFF | 0x3FFF FFFF | 128 MB |
| Partition # 2 | 0x4000 0000 | 0x7FFF FFFF | 0x77FF FFFF | 0x7FFF FFFF | 128 MB |
| Partition # 3 | 0x8000 0000 | 0xBFFF FFFF | 0xB7FF FFFF | 0xBFFF FFFF | 128 MB |
| Partition # 4 | 0xC000 0000 | 0xFFFF FFFF | 0xF7FF FFFF | 0xFFFF FFFF | 128 MB |

Figure 2:
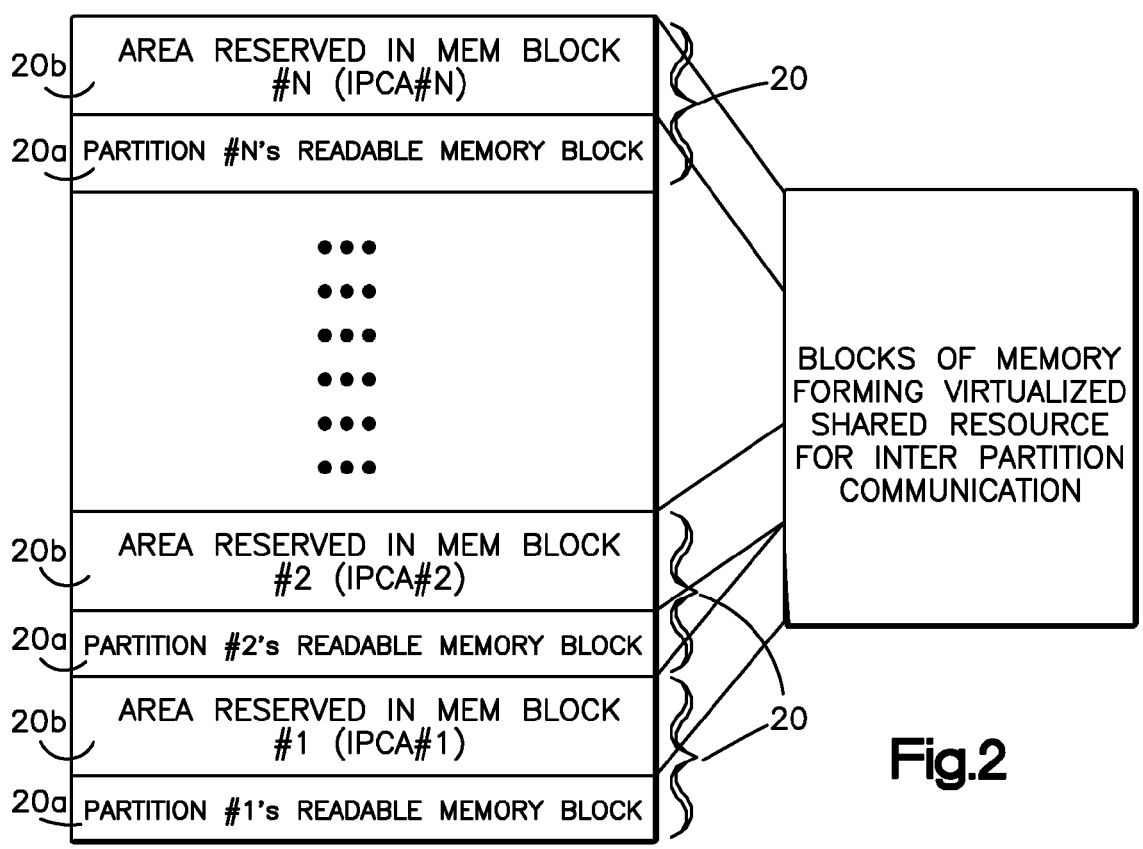
FIG. 2 is a schematic representation of the division of total system memory among partitions and within each partition's memory a block of memory is reserved for inter partition communication by the hypervisor.

This is shown diagrammatically in FIG. 2, where 20 represents the total memory assigned to partition #1, 20a represents the memory addressable only in partition #1, and 20b represents the IPCA memory of partition #1 accessible by other partitions with involvement from hypervisor firmware. The sum of all partition's IPCAs form total virtual shared resource (VSR), a block of non contiguous memory accessible by all the partitions under the supervision of hypervisor firmware. Total Virtual Shared Memory Resource (IPCA) =IPCA#1+IPCA#2+ . . . +IPCA#N*. *N is the maximum number of partitions on the data processing system.

In this embodiment, the sum of the non contiguous memory portions or IPCAs forming virtual shared resource (VSR) is being used for inter partition communication. Hypervisor firmware makes necessary adjustments such that total virtualized shared memory is accessible to all the partitions within a data processing system. Hypervisor also ensures that only the IPCA of a given partition is exposed to the rest of the partitions, and no other part of that partition's memory. In a server environment Logical Partitioning Option (LPAR) allows multiple copies of a single operating system or multiple heterogeneous server compliant operating systems to be simultaneously run on a single platform. A partition, within which an operating system image is running, is assigned a non-overlapping sub-set of the platform's resources. These resources include one or more processors with their interrupt management, regions of system memory and I/O adapter bus slots.

Since the main purpose for partitioning is isolation of the operating systems, the capability of managing real system resources that are common to all partitions is achieved through hypervisor rather than those resources being under direct control of a partition's operating system. Therefore, a logical partitioning platform employs a firmware component called the hypervisor, which runs in hypervisor mode, to manage the address mapping and common platform hardware facilities, thereby ensuring isolation between partitions and their resources. OS uses this hypervisor firmware interface to mange a partition's resources.

Apart from firmware component for logical partitioning, hypervisor support is also provided from hardware as well. IBM's eServer platforms supporting LPAR contain PowerPC processors that support hypervisor addressing mode in which the physical address is equal to the effective address and all processor resources are available. The "Real Mode" addressing, in these processors, is defined in such a way to translate and limit the physical addresses that the processor can access, and to restrict access to certain address translation controlling processor resources.

Figure 3:
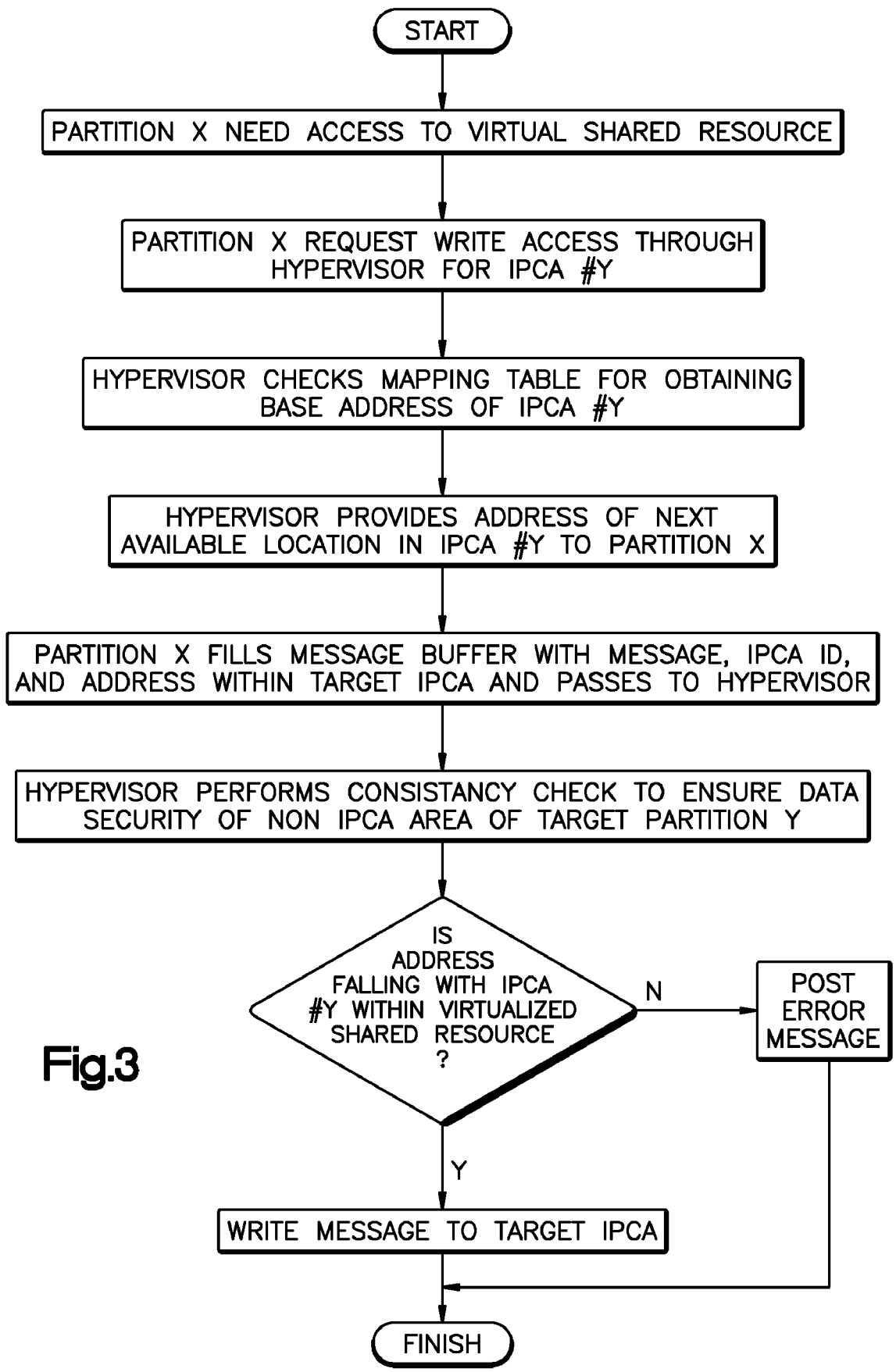
FIG. 3 is a flow chart for a source, partition X, to write to the inter partition communication area (IPCA) portion of the memory assigned to target partition, partition Y, within virtualized shared resource (VSR)
Figure 4:
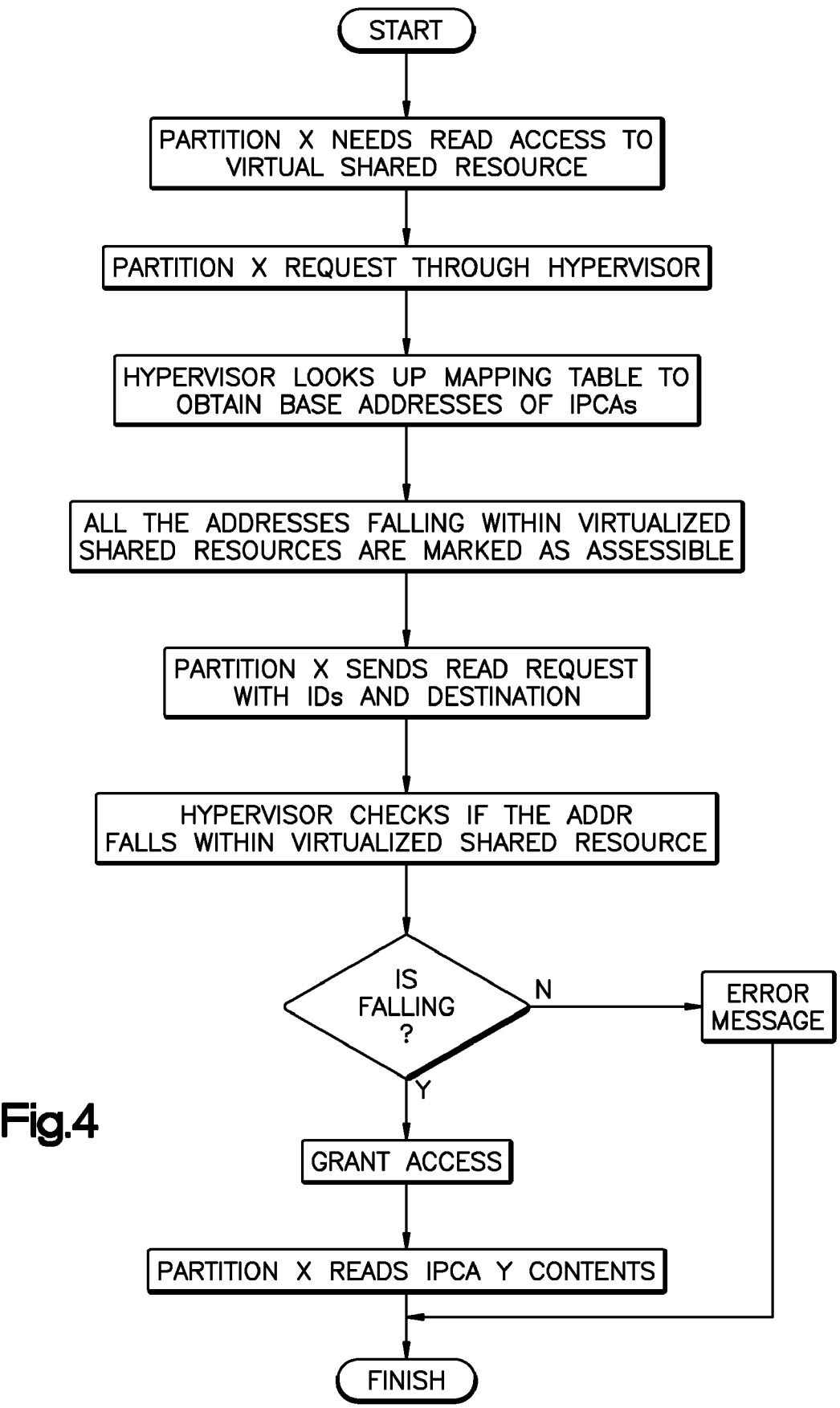
FIG. 4 is a flow chart showing a source partition, partition X, reading from the inter partition communication area (IPCA) portion of the memory assigned to target partition, partition Y, within virtualized shared resource (VSR)

FIG. 3 shows a flow chart for partition X to write to the IPCA of partition Y. FIG. 4 shows a flow chart where partition X reads from the IPCA of partition Y, and FIG. 5 shows a flow chart where partition X reads from its own IPCA.

Referring now to FIG. 3, a source partition, partition X, in data processing which needs to communicate to a destination partition, partition Y of the data processing system requests the same through hypervisor. Hypervisor then looks for the base address of the partition Y's communication area, IPCA#Y. Hypervisor then provides necessary access to partition X for writing the messages into IPCA#Y. An event scan routine within partition Y periodically checks for new messages under virtualized shared resource. On detection of a new message, partition Y reads the message and takes a responsive action. If an output from the responsive action is to be communicated to partition X, then partition Y initiates the communication process with partition X by repeating the same steps and delivering the message to partition X communication area IPCA#X.

Referring now to FIG. 4, which is a flow diagram of partition X reading the IPCA of partition Y, partition X requests, through hypervisor, a read in an IPCA. The hypervisor looks up the base address of the IPCAs, and all the addresses falling within the shared resources which are marked accessible. Partition X sends a read request with the I/O destination. Hypervisor then checks to see if the address falls in the shared resources. If the address is not within the shared resources, an error message is returned and the program is finished. If the address is within the shared resources, access is granted, and partition X reads the information in the IPCA assigned to partition Y.

Figure 5:
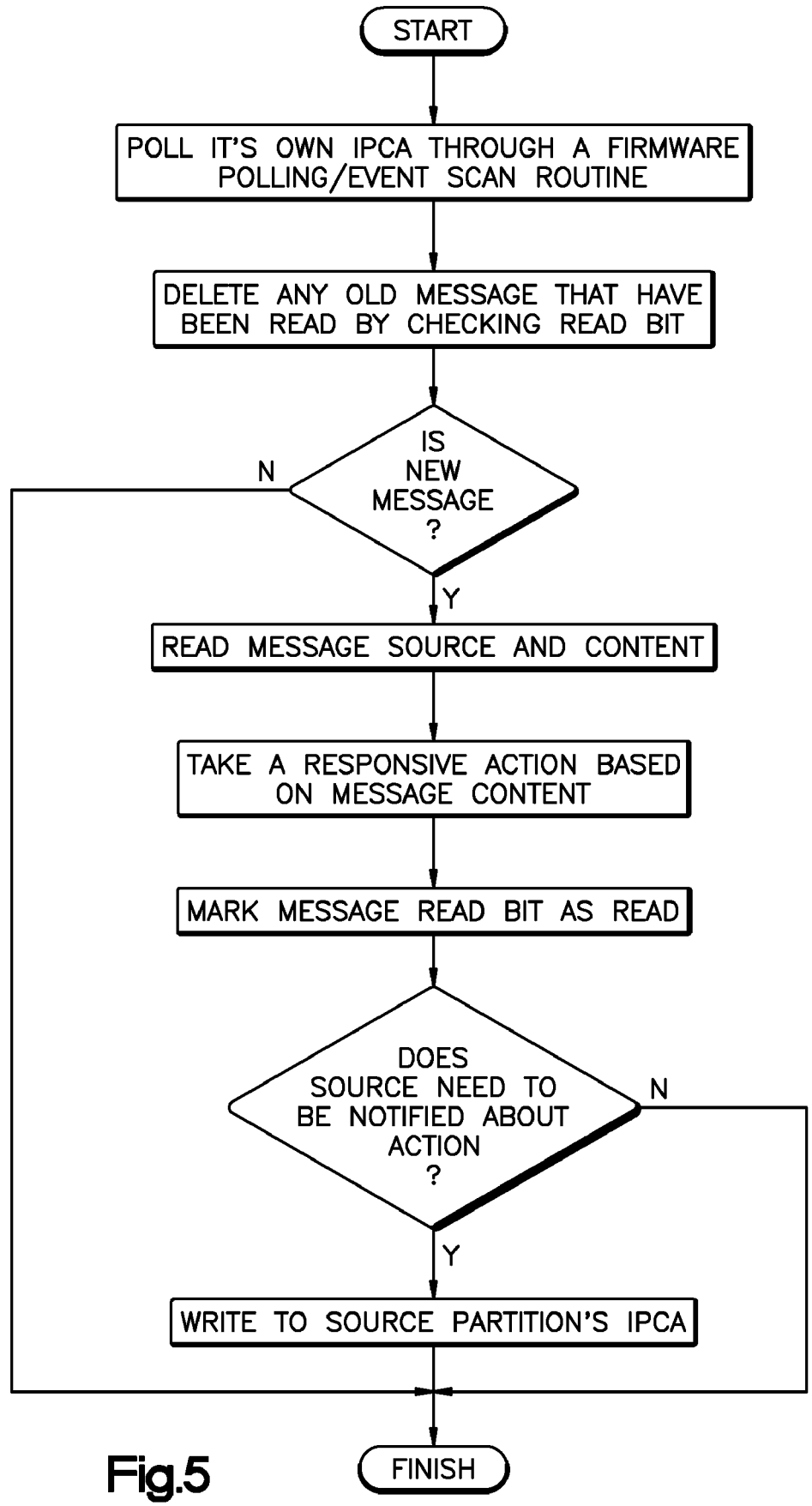
FIG. 5 is a flow chart showing where an individual partition, partition X, reads from its own inter partition communication area (IPCA) portion of memory within virtualized shared resource (VSR)

Referring now to FIG. 5, a flow chart for a partition to read its own IPCA for messages is shown. The partition polls its own IPCA for messages. Any old messages that have been read are deleted and then the IPCA is scanned for new messages. If no new messages are found, the program is ended. If a new message is found, the message source and content are read, a responsive action to the message content is taken, and the message is marked as read. A determination is made as to whether the source needs to be notified; if not, the program is ended and, if so, a write to the source partition's IPCA is made, after which the program is ended The hypervisor gets actively involved in the inter partition communication to ensure the transparency of virtualized shared resources and also to ensure the security of a non IPCA memory block within a partition. Hypervisor also ensures that no two partitions access the same IPCA# in the virtualized shared resource simultaneously. Within this embodiment, as many as N partitions, N being the maximum number of partitions on a system, can write to the virtualized shared resources simultaneously as long as those are accessing mutually exclusive IPCAs within VSR. Effectively, messages are written to a destination partition's memory for an action, utilizing virtualized shared resource; hence, response time on desired action is minimized.

Scenarios for Triggering Write Events Among Partitions

In a data processing system with a plurality of partitions, inter partition communication between the firmware and software of two partitions could be needed in multiple scenarios.

When a partition needs to write to virtualized shared resource—

Scenario-1

The actual invoking of a communication event can happen in multiple ways. For example, in the case of dynamic resource configuration or in case of dynamic logical partitioning, partition X may get an operating system initiated event indication through hypervisor that certain resources are being relocated from this partition X to another Partition Y. In those cases, OS will inform the partition about the actual resource that is being moved, along with the details of the partition to which it is going to be moved. Thus, this will trigger a communication event between partition X and partition Y. Partition X will write to partition Y's IPCA or virtualized shared resource (VSR) to give and an indication to partition Y about what resource changes are going to occur.

Scenario-2

Another case would be when various resources within a partition are over utilized due to increased work load from various running applications in that partition. In those cases, via OS performance check routines partition will determine that system needs additional resources to increase performance. Based on receiving the need, partition X will broadcast a message to all the other partitions to see if they have any underutilized resources which could dynamically be allocated to requesting partition (partition X). Read event triggers can be derived from above text as well; however, it will be apparent that a read event of partition Y from partition X is not necessary, but can be present, since partition Y can read its own IPCA.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the present invention as defined and limited by the appended claims.

What is claimed is:

1. A system, comprising:
    a processor; and
    a memory in communication with the processor;
    wherein the processor logically assigns portions of the memory to each one of a plurality of partitions of a virtual memory system in a partitioned data system, wherein each partition has its own assigned memory portion, with each assigned memory portion being accessible from its own partition, and each partition is under the control of a hypervisor;
    wherein each said assigned memory portion in each partition has an inter partition communication area (IPCA), wherein all of the IPCAs together form a virtual shared memory resource accessible from each partition of the plurality of partitions and inter partition communication between each one of the plurality of partitions is limited to the IPCAs;
    wherein under control of the hypervisor, in an event one partition requires additional resources, an IPCA of the one partition requiring additional resources communicates with the IPCAs of all other partitions to determine whether additional resources from the virtual shared memory resource may be allocated to the one partition requiring additional resources, and in the event the virtual shared memory resource informs the IPCA of the one partition that resources are being reallocated from the one partition to a second partition, the IPCA of the one partition writes to an IPCA of the second partition regarding the resources being reallocated from the IPCA of the one partition to the second partition.

2. The system as defined in claim 1, wherein the hypervisor is structured to permit writing of data of any one of the plurality of partitions in said IPCA of any other one of the plurality of partitions of said memory, and prohibits writing of data from one partition to the memory portion assigned to another partition except in said IPCA.

3. The system as defined in claim 1 wherein each one of said plurality of partitions can write to and read from any of the IPCAs.

4. An article of manufacture, comprising:
    a computer readable storage medium having a computer readable program embodied in said computer readable storage medium, wherein the computer readable program, when executed on a computer processor, causes the computer processor to:
    share information between different partitions of a plurality of partitions in a partitioned data processing system, wherein each block of a plurality of blocks of memory is assigned to each partition and is accessible by the assigned partition, by:
    assigning an area of said each block of memory of each partition to an inter partition communication area (IPCA), all of IPCAs together forming a virtual shared memory resource accessible by each of the plurality of partitions, each partition under the control of a hypervisor, and inter partition communication between each partition of the plurality of partitions is limited to the IPCAs;
    writing data of one of the plurality of partitions that needs to be accessed by at least one other one of said plurality of partitions only to an IPCA of the virtual shared memory resource,
    wherein during control of each partition using the hypervisor, in an event one partition requires additional resources, an IPCA of the one partition requiring additional resources communicates with the IPCAs of all other partitions to determine whether additional resources from the virtual shared memory resource may be allocated to the one partition requiring additional resources, and in the event the virtual shared memory resource informs the IPCA of the one partition that resources are being reallocated from the one partition to a second partition, the IPCA of the one partition writes to an IPCA of the second partition regarding the resources being reallocated from the IPCA of the one partition to the second partition.

5. The article of manufacture as defined in claim 4, wherein the hypervisor permits writing of data of any one of the plurality of partitions in said IPCA of any other one of the plurality of partitions of said memory, and prohibits writing of data from one partition to the memory assigned to another partition except in said IPCA.

6. The article of manufacture as defined in claim 4 wherein each one of said plurality of partitions can write to and read from any of the IPCAs.

7. The article of manufacture as defined in claim 4 wherein the computer readable storage medium is a flash module.

* * * * *